United States Patent [19]
de Carle

[11] 3,937,680
[45] Feb. 10, 1976

[54] HYDROPHILIC GEL TERPOLYMERS FROM HYDROPHILIC N-VINYL MONOMERS, HYDROXYALKYL ACRYLATES OR METHACRYLATES AND POLYMERIZABLE UNSATURATED CARBOXYLIC ACIDS

[75] Inventor: John Trevor de Carle, London, England

[73] Assignee: Global Vision, Inc., Parsippany, N.J.

[22] Filed: May 29, 1973

[21] Appl. No.: 364,532

Related U.S. Application Data

[63] Continuation-in-part of Ser. No. 223,122, Feb. 3, 1972, abandoned.

[52] U.S. Cl. ........... 260/29.6 TA; 260/80.72; 264/1; 351/160 T
[51] Int. Cl.$^2$ ..................... C08L 39/06; B29D 11/00; G02C 7/04
[58] Field of Search ................... 260/29.6 TA, 80.72

[56] References Cited
UNITED STATES PATENTS

| | | | |
|---|---|---|---|
| 3,639,524 | 2/1972 | Seiderman | 260/885 |
| 3,721,657 | 3/1973 | Seiderman | 260/80.72 |
| 3,787,380 | 1/1974 | Stamberger | 260/29.6 TA X |
| 3,792,028 | 2/1974 | Seiderman | 260/29.6 WB X |
| 3,803,093 | 4/1974 | Neefe | 260/29.6 TA |

*Primary Examiner*—Lucille M. Phynes
*Attorney, Agent, or Firm*—Thomas R. Boland

[57] ABSTRACT

A hydrophilic terpolymer suitable for manufacture into shaped articles, said terpolymer being substantially the polymerization product of hydroxyalkyl acrylate or methacrylate, a vinyl comonomer having a high affinity for water, e.g. N-vinyl pyrrolidone, and a polymerizable, unsaturated carboxylic acid, e.g. methacrylic or acrylic acid. The terpolymer is particularly adaptable for use as a contact lens by bringing it in contact with a buffered aqueous alkaline solution thereby affording a hydrogel having a water content between about 55–85% by weight of the total.

A preferred embodiment of the invention is the polymerization product of a reaction mixture comprising 30–50% by weight of vinyl pyrrolidone, up to about 3% of a crosslinking agent such as ethylene glycol di-methacrylate, methacrylic acid amounting to about 0.25—3.5% by weight, and 2-hydroxyethyl methacrylate which constitutes the balance.

4 Claims, No Drawings

HYDROPHILIC GEL TERPOLYMERS FROM HYDROPHILIC N-VINYL MONOMERS, HYDROXYALKYL ACRYLATES OR METHACRYLATES AND POLYMERIZABLE UNSATURATED CARBOXYLIC ACIDS

CROSS REFERENCE TO RELATED APPLICATION

This is a continuation-in-part of the now abandoned application Ser. No. 223,122, filed Feb. 3, 1972.

BACKGROUND OF THE INVENTION

1. Field of the Invention

This invention is directed to hydrophilic terpolymers and to shaped hydrogel articles, especially contact lenses, produced therefrom.

2. Description of the Prior Art

Interest has arisen in recent years in hydrophilic plastic materials for use in the manufacture of contact lenses because in the hydrated state the polymer is soft and jelly-like and could be expected to be tolerated more readily than conventional hard plastic materials such as methacrylates. Thus, Wichterle et al. in U.S. Reissue Pat. No. 27,401 discloses a hydrogel, allegedly containing up to 97% by weight of water, which is formed from a hydroxyalkyl acrylate or methacrylate sparingly crosslinked with the corresponding diester. The amount of water which such hydrophilic polymers are capable of retaining is, as stated by Wichterle, inversely proportional to the degree of crosslinking so that the hydrogels having a high water content can only be obtained when the extent of crosslinking is very small. Other compositions including polyvinylpyrrolidone (PVP) graft copolymers have been developed for contact lenses but the significant solubility of the PVP structure in water over a relatively short period of time has created undesirable characteristics in such lenses. U.S. Pat. No. 3,532,679 to Steckler discloses a crosslinked copolymer comprising a vinyl lactam and an acrylic ester monomer, but the amount of lactam required in the composition is so high as to affect the mechanical properties of the resulting lens product, which is described as containing up to 95% water. High water content contact lenses such as proposed by Wichterle and Steckler are characterized by relatively high rates of transmission of gaseous metabolites to and from the cornea but this positive feature is countered by their poor mechanical properties. Hydrophilic contact lenses having less than 50% water content have good mechanical properties but do not exhibit sufficiently high oxygen transmission characteristics to facilitate permanent wear. Thus, in order to prevent anoxic edema such lenses must be removed during non-waking hours.

Therefore, the need exists for contact lenses possessing good corneal respiration along with good mechanical properties.

SUMMARY OF THE INVENTION

It has now been discovered that polymeric hydrogels having high water contents in the range of about 55% to about 85% which are particularly suitable for contact lenses can be produced from crosslinked terpolymers which in their broadest aspect comprise the reaction product of a hydroxyalkyl acrylate or methacrylate, a heterocyclic N-vinyl monomer, a polymerizable unsaturated carboxylic acid and a crosslinking monomer such as a glycol dimethacrylate or diacrylate.

In general, the terpolymer of this invention is formed by polymerizing about 30–50% by weight of heterocyclic N-vinyl monomer, up to about 3% of a glycol dimethacrylate or diacrylate crosslinking agent, between about 0.25–5.6% by weight unsaturated carboxylic acid, and hydroxyalkyl acrylate or methacrylate which constitutes the balance of the mixture. Hydrogels formed by contacting such a terpolymer with an aqueous alkaline solution have a water content between about 55–85% by weight.

Accordingly, it is a principal object of this invention to provide a hydrophilic terpolymer adaptable for the production of shaped articles, particularly contact lenses.

It is another object of the invention to provide a terpolymer which when contacted with an aqueous alkaline solution will form a hydrogel having a water content of 55–85% by weight of the total.

It is a further object of the invention to provide a process for forming a hydrogel having mechanical properties suitable for forming contact lenses and having a water content of 55–85% by weight of the total.

These and other objects and advantages of the present invention will become more apparent in the following description and appended claims.

DESCRIPTION OF THE PREFERRED EMBODIMENTS

Among the preferred heterocyclic N-vinyl monomers used in connection with the present invention are N-vinyl lactams, such as N-vinyl-2-pyrrolidone, N-vinyl-2-piperidone and N-vinyl-e-caprolactam. Other suitable compounds include N-vinylimidazolidone, N-vinyl succinimide and the like. Such N-vinyl monomers are commercially available and produced by well known methods. U.S. Pat. No. 2,317,804, for example, discloses a suitable method for forming N-vinyl lactams.

It has been demonstrated that the higher water capacity of the hydrogels is due to the presence of the carboxylic groups which are attached to or incorporated in the polymer chain. Contact lenses made from the terpolymers of the present invention have been shown to possess high oxygen and metabolite transmission characteristics which leads to a high degree of toleration by lens wearers who have stressed their comfort and ease of adaptation to the lenses. It is believed that this compatibility of the lenses with the human eye may be at least partially due to the close similarity in the water content of the lenses and cornea of the human eye since the eye contains a very high percentage of water, variously estimated at between about 72% and 81% by weight. Preferably, the lenses of the present invention have a percentage water content approximating this range, although lenses having a water content between about 60% and 80% have been found to be very satisfactory.

A degree of crosslinking of the terpolymer is necessary to form a three-dimensional polymer skeleton in which water can be accommodated. However, increasing the degree of crosslinking tends to reduce the water holding capacity while at the same time increasing the rigidity and strength of the hydrogel. Reduction in water holding capacity arising from a higher degree of crosslinking can be offset to some extent by increasing the proportion of the vinyl pyrrolidone component or other vinyl comonomer, but this is accompanied by undesirable changes in mechanical properties.

Generally speaking, no advantage is gained by using more than about 2% to about 3% of crosslinking material by weight of the other components of the terpolymer. Various crosslinking materials may be employed such as glycol diacrylates, glycol dimethacrylates (including ethylene and propylene glycol diacrylates and methacrylates), polyethylene glycol diacrylates and dimethacrylates and allyl methacrylate. Tri- or polyfunctional monomers such as triallyl cyanurates may also be utilized as crosslinking agents with considerable effectiveness.

As stated above, the higher the proportion of vinyl pyrrolidone, for example, in the terpolymer, the higher the water holding capacity. However, an additional effect of increasing the proportion of vinyl pyrrolidone is to reduce the mechanical strength of the polymer. Thus, the proportion of vinyl pyrrolidone and the degree of crosslinking have to be balanced to obtain the desired product.

However, in order to form the intended product of this invention, the amount of vinyl pyrrolidone will not exceed 60% and will preferably constitute between about 30–50% by weight of the total. However, it should be emphasized that there is no critical minimum amount of vinyl pyrrolidone (VP) since any proportion will have some beneficial effect. Nevertheless, for practical purposes, the terpolymer will contain at least about 10% VP based on the total weight thereof.

The choice of the hydroxyalkyl acrylate or methacrylate is not critical and satisfactory results may be achieved using acrylates and methacrylates in which the alkyl groups contain from 1 to 4 carbon atoms, although the hydroxyethyl and hydroxypropyl compounds are preferred.

The third principal monomeric component of the terpolymers of the invention is a polymerizable, unsaturated carboxylic acid. While present in a comparatively minor proportion, this constituent is important in increasing the water holding capacity of the terpolymer when exposed to alkaline solutions. The preferred compounds in this category are methacrylic acid and acrylic acid which are incorporated in amounts ranging from 0.25–5.6% by weight of the total.

The carboxylic acid moieties in the terpolymer impart a substantial effect on equilibrium water content of the hydrogel. For example, a terpolymer specimen as previously described, made with 3.5% methacrylic acid (MA) by weight of the total in the monomer mixture, equilibrated to a water content of about 80% by weight in alkaline solution; whereas a comparable specimen formed without MA equilibrated to about 60% by weight in the same alkaline solution.

However, the higher water content capability of the carboxylic acid moiety containing terpolymer is achieved only by conversion of the free carboxylic acid groups in the hydrogel to ionized carboxylate groups, such as the Na, K, Ca, $NH_3$ and Mg forms. Thus, such conversion is effected through treatment of the terpolymer by an aqueous solution reactive with the free carboxylic acid groups, notably treatment with an alkaline aqueous solution. The conversion may be effected by equilibrating the terpolymer with a buffered aqueous solution of pH 6 or higher. Comparable treatment with de-ionized water or isotonic saline will not hydrate the terpolymer beyond the levels obtained without any MA content. Indeed, absent an alkaline conversion treatment, the presence of a carboxylic acid moiety seems to nominally decrease the water retention capability of the terpolymer hydrogel.

Preferably, treatment is with buffered aqueous sodium bicarbonate, carbonate or hydroxide. Treatment may also be with a conventional alkaline biocide solution.

Without being bound thereto, it is theorized that free carboxylic acid groups (from the MA) bound into the hydrogel react with the alkaline ions. On treatment of hydrogel test specimens with aqueous sodium bicarbonate, formation of gas bubbles may be observed. It is theorized further that the metal ions displace the weakly ionic hydrogen ions, thereby forming highly ionized metal carboxylate groups, and these highly ionic structures having a high hydration demand induced the imbibition of much larger amounts of water. Test specimens Soxhlet extracted for 48 hours with water and then equilibrated in buffered alkaline aqueous solutions contained a sodium content reasonably consistent with the MA proportion in the monomer mixture. Such test specimens exhibited far greater water retention levels than like specimens equilibrated in 0.9% saline (76 wt % as compared to 57 wt %). Treatment of the test specimens with 5% HCl reduced their water retention capability to about the level of the 0.9% saline equilibrated specimens (to 60 wt %). The highly ionized hydrogen ions of HCl readily displaced the metallic ions because of the favorable equilibrium to the virtually unionized free carboxylic form. Conversion of strongly ionic groups to weakly ionic groups causes desorption of significant amounts of $H_2O$. Subsequently, equilibrating in the buffered alkaline aqueous solution increased the water retention capability to the previous level.

The above described treatment of the terpolymer hydrogel to convert the free carboxylic acid moiety into an alkaline carboxylate moiety is considered to be an important aspect of this invention.

As previously stated, the N-vinyl monomer, e.g. vinyl pyrrolidone, may be present in the polymerization mixture in a proportion of from 10–60% by weight of the total. However, within the context of a hydrogel having a water content of 55–85% by weight, when the polymerization mixture contains acrylic acid or methacrylic acid in amounts between 0.25–5.6%, preferably 1.25–2.8% by weight, based on the total, the amount of vinyl pyrrolidone utilized in the mixture will be between about 30–50% by weight, preferably 35–45% by weight.

The preferred hydrogel terpolymer compositions will be formed from a polymerization reaction mixture containing hydroxyethyl methacrylate (HEMA), vinyl pyrrolidone (VP), methacrylic acid (MA), and ethylene glycol dimethacrylate (Di-Ester).

In the manufacture of the hydrophilic polymer, it is preferred to use mild conditions and carry out polymerization at a relatively low temperature and over an extended period. It is believed that this results in a product having better properties. In the preferred procedure, the monomers are mixed together without a solvent or dispersant, but with no more than 1% of total weight of a conventional addition polymerization catalyst, e.g. a peroxy free-radical catalyst, and filled into a polyethylene container and held at a temperature of about 50° to 75°C. for several hours. Polyethylene has been found particularly useful since the polymer adheres strongly to glass but can be removed without difficulty from polyethylene. For example, in one embodiment relating to producing contact lenses, if a polyethylene tube having a diameter corresponding to the diameter of the contact lens blank is used, on completion of the initial polymerization stage a rod of solid polymer can be removed from the tube and sliced into discs of the desired size for use as contact lens blanks in the manufacture of the contact lenses. Alternatively, the polymerization may be carried out in polyethylene molds of desired shape, thus producing preformed blanks for subsequent lens manufacture. The blanks so obtained are slightly soft and are heated for about a day at about 75°C to 100°C. in order to complete the polymerization or crosslinking reactions and to produce contact lens blanks which are hard enough to be cut and polished using conventional contact lens cutting and polishing techniques. During this second heating stage, some annealing of the blanks may occur. The two-stage polymerization process is desirable because if one attempts to heat the polymerization reaction mixture initially to a temperature above about 75°C., bubbles may tend to form and are retained in the resultant polymer.

In a preferred practice, the lenses are water extracted in a Soxhlet apparatus for an extended period of time, e.g. 24 hours. The preferred lenses, prepared according to the examples set forth hereafter, will have a water content, after equilibrium in an isotonic saline solution of 0.9% concentration by weight, of about 54% and when similarly equilibrated following extraction in a Soxhlet apparatus for 24 hours, a water content of about 57% by weight. However, subsequent to equilibration with an alkaline aqueous solution, the water content will be about 75% by weight.

Treatment of the lenses to form alkali carboxylate salt moieties thereon need not be deferred until after the extraction treatment. It may be effected at any time subsequent to the initial hydration, as for example, before, or even during, the course of extraction treatment. If the extracted lenses are also treated with a biocidal solution, such treatment may be combined with the alkaline treatment. Indeed, some proprietary biocidal compositions are themselves buffered, mildly alkaline solutions. Thereafter, the lenses may be washed and stored in a mildly alkaline isotonic saline or in a biocidal solution. The lenses should be so kept, because they dry out relatively quickly when not in contact with an aqueous fluid, as do conventional lenses.

The lenses of the present invention may be sterilized by boiling in water without deterioration of the terpolymer. However, it has been found in practice that the lenses of the invention do not require routine sterilization in normal use.

Unless otherwise indicated, all weight percentages indicated in the present disclosure are based on the total weight of a mixture.

The following examples will further illustrate the invention.

EXAMPLE I

A polymerization mixture was prepared by mixing 57.8% by weight of 2-hydroxyethyl methacrylate (HEMA) with 40% by weight of N-vinyl pyrrolidone, 1.7% by weight of ethylene glycol dimethacrylate, 0.5% by weight methacrylic acid and 1% by weight of benzoyl peroxide was subsequently added to the mixture. The polymerization mixture was poured into small shaped molds. By inserting the molds in a thermostatically controlled oven, the reaction temperature was maintained at about 75°C. and the reaction was allowed to proceed for 5 hours. After this time, the oven temperature was raised 100°C. for a further period of 24 hours. The blanks were, after cooling, removed from the molds and cut and polished in the normal way. Thereafter, the lenses were extracted (24 hours in a Soxhlet).

When treated with an alkaline pH 9 biocidal preparation applicable to contact lenses by immersion to equilibrium water intake, the soft lenses were found to have water contents of about 70–75% by weight.

EXAMPLE II

A series of lens sized test specimens were made according to the above described procedure (including 24 hours Soxhlet extraction) with the same monomer proportions, varying only the methacrylic acid from 0–7% and a proportionate amount of HEMA. The extracted specimens were then treated in two ways; one set was equilibrated in a buffered alkaline saline solution and the other in isotonic saline, then washed with water.

The test results are tabulated below:

| % MA | Water Content - % by Wt | |
|---|---|---|
| | Saline | Sodium bicarbonate/Saline |
| 0 | 60 | 60 |
| 0.3 | 59 | 61 |
| 0.7 | 58 | 65 |
| 2.1 | 55 | 75 |
| 3.5 | 53 | 80 |
| 7.0 | 50 | 87 |

EXAMPLE III

A series of crosslinked terpolymer specimens were prepared with varying percentages of vinyl pyrrolidone in the monomer mixture. Throughout the series, methacrylic acid was 2% by weight of the total monomer; ethylene glycol dimethacrylate was 0.8% by weight of the total monomer; the catalyst CYCLONOX LE-50 (cyclohexanone peroxide sold by Novadel, Ltd., Peroxide Division) constituted 2.5 ml/102g of monomer; and HEMA was the balance. The polymerization was effected by heating 48 hours at 80°C. in a nitrogen atmosphere.

In the hard state, softening point and hardness were similar in all specimens.

The specimens were water extracted, then one set equilibrated in 0.9% saline, the other in buffered alkaline saline solution and the water retentions measured. The results are tabulated below:

| % VP | Saline | Sodium bicarbonate/Saline |
|---|---|---|
| 0 | 31% | 57% |
| 10 | 39 | 60 |
| 20 | 42 | 66 |
| 50 | 60 | 78 |
| 70 | 75 | 87 |
| 80 | 83 | 90 |
| 90 | 89 | 95 |

The results indicate that water retention ability increased linearly with VP content. It may be noted that even with zero % VP, the presence of MA permits attainment of 57% water content.

EXAMPLE IV

A series of terpolymer test specimens were prepared from a monomer mixture of 3:2 volume ratio HEMA/VP. The HEMA contained methacrylic acid and 0.8% ethylene glycol dimethacrylate. The polymerization catalyst and conditions of Example 1 were employed.

After water extraction, the test specimens were equilibrated in buffered aqueous solutions at various pHs, then the water content measured. The results are tabulated below.

| pH | Buffer Type | Water Content % |
|---|---|---|
| 6.0 | NaOH/KH$_2$PO$_4$ | 68 |
| 6.4 | " | 75 |
| 6.85 | " | 76 |
| 7.2 | " | 76 |
| 7.6 | " | 76 |
| 8.0 | NaOH/H$_3$BO$_3$ | 76 |
| 8.5 | " | 81 |
| 8.9 | " | 80 |
| 9.3 | " | 80 |
| 9.7 | " | 79 |
| 10.1 | " | 78 |

Substituting acrylic acid for the methacrylic acid in the monomer mixture produced a similar enhancement in water retention after equilibration with the buffered solutions.

EXAMPLE V

Specimens prepared as described in Example IV were treated as follows after water extraction.

Specimens equilibrated in 0.9% saline exhibited a water content of 57%.

Specimens equilibrated in buffered alkaline solution, then in 0.9% saline solution, exhibited a water content of 75% after the alkaline solution, 77% after the saline.

Some buffered alkaline solution equilibrated specimens were treated with 5% HCl, then water extracted. The water content was 60%. Upon subsequent re-equilibration with the buffered alkaline solution the water content rose to 76%.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

What is claimed is:

1. A contact lens which comprises a terpolymer hydrogel containing from about 55% to about 85% by weight of water based on the total weight of the hydrogel, the molecular structure of said terpolymer including alkaline carboxylate moieties therein and being the hydrated polymeric product resulting from the polymerization of a monomer mixture comprising 30–50% by weight of N-vinyl lactam, up to 3% by weight of a glycol dimethacrylate or diacrylate, 0.25–5.6% by weight acrylic or methacrylic acid and a hydroxyalkyl acrylate or methacrylate monomer which constitutes the balance of the mixture.

2. The contact lens according to claim 1 in which the N-vinyl lactam is N-vinyl pyrrolidone.

3. A contact lens which comprises a hydrogel containing from about 55% to about 85% by weight of water based on the total weight of the hydrogel, said hydrogel being a hydrated crosslinked terpolymer obtained by:
   a. addition polymerization of a monomer mixture essentially consisting of 35–40% by weight N-vinyl pyrrolidone, about 1.75–2.8% by weight methacrylic acid, about 0.5–2.0% by weight ethylene glycol dimethacrylate, and the balance being hydroxyethyl methacrylate; and
   b. hydrating the addition polymerization product so as to convert the free carboxylic acid groups therein to ionized alkaline carboxylate groups.

4. A hydrogel containing about 55% to about 85% by weight of water based on the total weight of the hydrogel, said hydrogel including alkaline carboxylate moieties in the molecular structure thereof and comprising the crosslinked terpolymeric product of a monomer mixture including 30–50% by weight of an N-vinyl lactam, up to about 3% of a glycol dimethacrylate or diacrylate crosslinking agent, between about 0.25–5.6% by weight of a polymerizable unsaturated carboxylic acid, and a hydroxyalkyl acrylate or methacrylate monomer which constitutes the balance of the mixture.

* * * * *